(12) United States Patent
Kim

(10) Patent No.: US 6,958,805 B2
(45) Date of Patent: Oct. 25, 2005

(54) APPARATUS AND METHOD FOR ALIGNING HOLOGRAPHIC ROM SYSTEM

(75) Inventor: Kun Yul Kim, Seoul (KR)

(73) Assignee: Daewoo Electronics Corporation, (KR)

( * ) Notice: Subject to any disclaimer, the term of this patent is extended or adjusted under 35 U.S.C. 154(b) by 114 days.

(21) Appl. No.: 10/749,844

(22) Filed: Dec. 31, 2003

(65) Prior Publication Data

US 2004/0263815 A1    Dec. 30, 2004

(30) Foreign Application Priority Data

Jun. 30, 2003  (KR) ..................... 10-2003-0043179

(51) Int. Cl.$^7$ .................. G03B 27/54; G03B 27/00; G01B 11/00
(52) U.S. Cl. ...................... 355/67; 355/2; 356/400
(58) Field of Search ............... 355/67, 2, 77; 356/399, 400, 401; 359/9, 12, 15, 24; 430/1, 430/2

*Primary Examiner*—Peter B. Kim
(74) *Attorney, Agent, or Firm*—Anderson Kill & Olick, PC

(57) ABSTRACT

Before recording data included in a data mask on a holographic medium, the data mask and the holographic medium are aligned by an aligner, which includes a beam supplying unit for supplying an incident laser beam; a transferring unit for receiving the incident laser beam and producing a focused laser beam; a reflecting unit including the holographic medium for receiving the focused laser beam through a pinhole and then reflecting the received laser beam back to the pinhole, wherein the reflected laser beam passing through the pinhole returns to the transferring unit and then is converted into a return laser beam by the transferring unit; and a detecting unit for checking the amount of the return laser beam to determine whether the pinhole and the holographic medium are aligned or not.

9 Claims, 5 Drawing Sheets

APPARATUS AND METHOD FOR ALIGNING HOLOGRAPHIC ROM SYSTEM

FIELD OF THE INVENTION

The present invention relates to an apparatus and method for aligning a holographic ROM system; and, more particularly, to an apparatus and method for aligning the holographic ROM system for preventing a data mask and a holographic medium from being misaligned before data patterns are recorded on the holographic medium, to thereby reduce errors at the time of recording and playback.

BACKGROUND OF THE INVENTION

Conventional holographic memory systems normally employ a page-by-page storage approach. An input device such as SLM (spatial light modulator) presents recording data in the form of a two dimensional array (referred to as a page), while a detector array such as CCD camera is used to retrieve the recorded data page upon readout. Other architectures have also been proposed wherein a bit-by-bit recording is employed in lieu of the page-by-page approach. All of these systems, however, suffer from a common drawback that they require the recording of huge quantities of separate holograms in order to fill the memory to its full capacity. A typical page-oriented system using a megabit-sized array would require the recording of hundreds of thousands of hologram pages to reach the capacity of 100 GB or more. Even with the hologram exposure times of millisecond-order, the total recording time required for filling a 100 GB-order memory may easily amount to at least several tens of minutes, if not hours. Thus, another conventional holographic ROM system has been developed, where the time required to produce a 100 GB-order capacity disc may be reduced to under a minute, and potentially to the order of seconds.

FIG. 1 shows a conventional holographic ROM system including a light source 10; a shutter 12; mirrors 14, 28, 34, 40; HWPs (half wave plates) 16, 24, 36; spatial filters 18, 30, 42; lenses 20, 44; a PBS (polarization beam splitter) 22; polarizers 26, 38; a conical mirror 32; a data mask 46; and a holographic medium 48.

The light source 10 emits a laser beam with a constant wavelength, e.g., a wavelength of 532 nm. The laser beam, which is of only one type of linear polarization, e.g., P-polarization or S-polarization, is provided to the mirror 14 via the shutter 12 which is opened to transmit the laser beam therethrough when recording data on the holographic medium 48. The mirror 14 reflects the laser beam to the HWP 16. The HWP 16 rotates the polarization of the laser beam by θ degree (preferably 45°). And then, the polarization-rotated laser beam is fed to the spatial filter 18 for removing noises included in the polarization-rotated laser beam. And then, the polarization-rotated laser beam is provided to the lens 20 for expanding the beam size of the laser beam up to a predetermined size. Thereafter, the expanded laser beam is provided to the PBS 22.

The PBS 22, which is manufactured by repeatedly depositing at least two kinds of materials each having a different refractive index, serves to transmit, e.g., a horizontally polarized laser beam, i.e., S-polarized beam, along a S1 path and reflect, e.g., a vertically polarized laser beam, i.e., P-polarized beam, along a S2 path. Thus the PBS 22 divides the expanded laser beam into a transmitted laser beam (hereinafter called a reference beam) and a reflected laser beam (hereinafter called a signal beam) having different polarizations, respectively.

The signal beam, e.g., of a S-polarization, is reflected by the mirror 34. And then the reflected signal beam is provided to the mirror 40 via the HWP 36 and the polarizer 38 sequentially. Since the HWP 36 can rotate the polarization of the signal beam by θ' degree and the polarizer 38 serves to pass only a P-polarized signal beam, the HWP 36 and the polarizer 38 can regulate the amount of the P-polarized signal beam arriving at the mirror 40 by changing θ'. And then the P-polarized signal beam is reflected by the mirror 40 toward the spatial filter 42 for removing imperfectly polarized components of the signal beam and allows only the purely P-polarized component thereof to be transmitted therethrough. And then the signal beam with perfect or purified polarization is provided to the lens 44 for expanding the beam size of the signal beam up to a preset size. Thereafter, the expanded signal beam is projected onto the holographic medium 48 via the data mask 46. The data mask 46, presenting data patterns for recording, functions as an input device, e.g., a spatial light modulator (SLM).

Meanwhile, the reference beam is fed to the mirror 28 via the HWP 24 and the polarizer 26 sequentially. Since the HWP 24 can rotate the polarization of the reference beam by θ" degree and the polarizer 26 serves to pass only a P-polarized reference beam, the HWP 24 and the polarizer 26 can regulate the amount of the P-polarized reference beam arriving at the mirror 28 by changing θ". Therefore, the polarization of the reference beam becomes identical to that of the signal beam. And then the mirror 28 reflects the P-polarized reference beam toward the spatial filter 30 which removes imperfectly polarized components of the reference beam and allows only the purely P-polarized component thereof to be transmitted therethrough. And then the reference beam with perfect or purified polarization is projected onto the conical mirror 32 (the conical mirror 32 being of a circular cone having a circular base with a preset base angle between the circular base and the cone), which is fixed by a holder (not shown). The conical mirror 32 reflects the reference beam toward the holographic medium 48. The incident angle of the reflected reference beam on the holographic medium 48 is determined by the base angle of the conical mirror 32.

FIG. 2 shows a conventional method for recording data in the holographic ROM, in detail. As shown in FIG. 2, the holographic medium 48 is a disk-shaped material for recording the data patterns. The data mask 46, also having a disk shape with a similar size to that of the holographic medium 48, provides the data patterns to be stored in the holographic medium 48. By illuminating the data mask 46 with a normally incident plane wave, i.e., the signal beam, and by using the reference beam incident from the opposite side to record holograms in the reflection geometry shown in FIG. 2, the diffracted pattern is recorded on the holographic medium 48. A conical beam shape is chosen to approximate the plane wave reference beam with a constant radial angle at all positions on the disc, such that the hologram can be read locally by a fixed-angle narrow plane wave while the disc is rotating during playback. Furthermore, an angular multiplexing can be realized by using the conical mirror 32 with a different base angle.

However, in case a center 46a of the data mask 46 and a center 48a of the holographic medium 48 are misaligned, i.e., the data mask 46 and the holographic medium 48 are not coaxially aligned, as shown in FIG. 3, the data patterns are recorded along tracks 48c which are also misaligned with the holographic medium 48. Then, since the recorded tracks 48c are not matched with tracks 48b during playback, it becomes difficult to reproduce the data patterns during playback. Therefore, the alignment of the data mask 46 and the holographic medium 48 should be executed before the data patterns are recorded.

SUMMARY OF THE INVENTION

It is, therefore, an object of the present invention to provide an apparatus and a method for aligning a holographic ROM system by detecting whether a data mask and a holographic medium are aligned or not, before data patterns are recorded on the holographic medium.

In accordance with one aspect of the present invention, there is provided a holographic apparatus including: a beam supplying unit for supplying an incident laser beam; a transferring unit for receiving the incident laser beam and producing a focused laser beam; a reflecting unit including a holographic medium for receiving the focused laser beam through an opening and then reflecting the received laser beam back to the opening, wherein the amount of the reflected laser beam passing through the opening varies depending on whether or not the holographic medium is aligned with the opening, and wherein the reflected laser beam passing through the opening returns to the transferring unit and then is converted into a return laser beam by the transferring unit; and a detecting unit for checking the amount of the return laser beam to determine whether the opening and the holographic medium are aligned or not.

In accordance with another aspect of the present invention, there is provided a holographic apparatus including: a beam supplying unit for supplying an incident laser beam; a lens for focusing the incident laser beam at an opening to thereby produce a focused laser beam; a data mask, which is used for recording data therein on a holographic medium and has the opening at a central portion thereof, for transmitting the focused laser beam through the opening; and a reflection mirror, coupled with the holographic medium, for reflecting the focused laser beam transmitted by the data mask, wherein the reflected laser beam passing through the opening is provided to a detecting unit for checking the amount of the reflected laser beam passing through the opening to determine whether the data mask and the holographic medium are aligned or not.

In accordance with a further aspect of the present invention, there is provided a holographic method including the steps of: (a) providing an incident laser beam; (b) transmitting the incident laser beam through an opening which is located at a central portion of a data mask which is used for recording data therein on a holographic medium; (c) reflecting the transmitted incident laser beam by a reflection mirror which is coupled with the holographic medium; (d) transmitting the reflected laser beam through the opening; and (e) detecting the amount of the reflected laser beam passing through the opening to determine whether the data mask and the holographic medium are aligned or not.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 4:
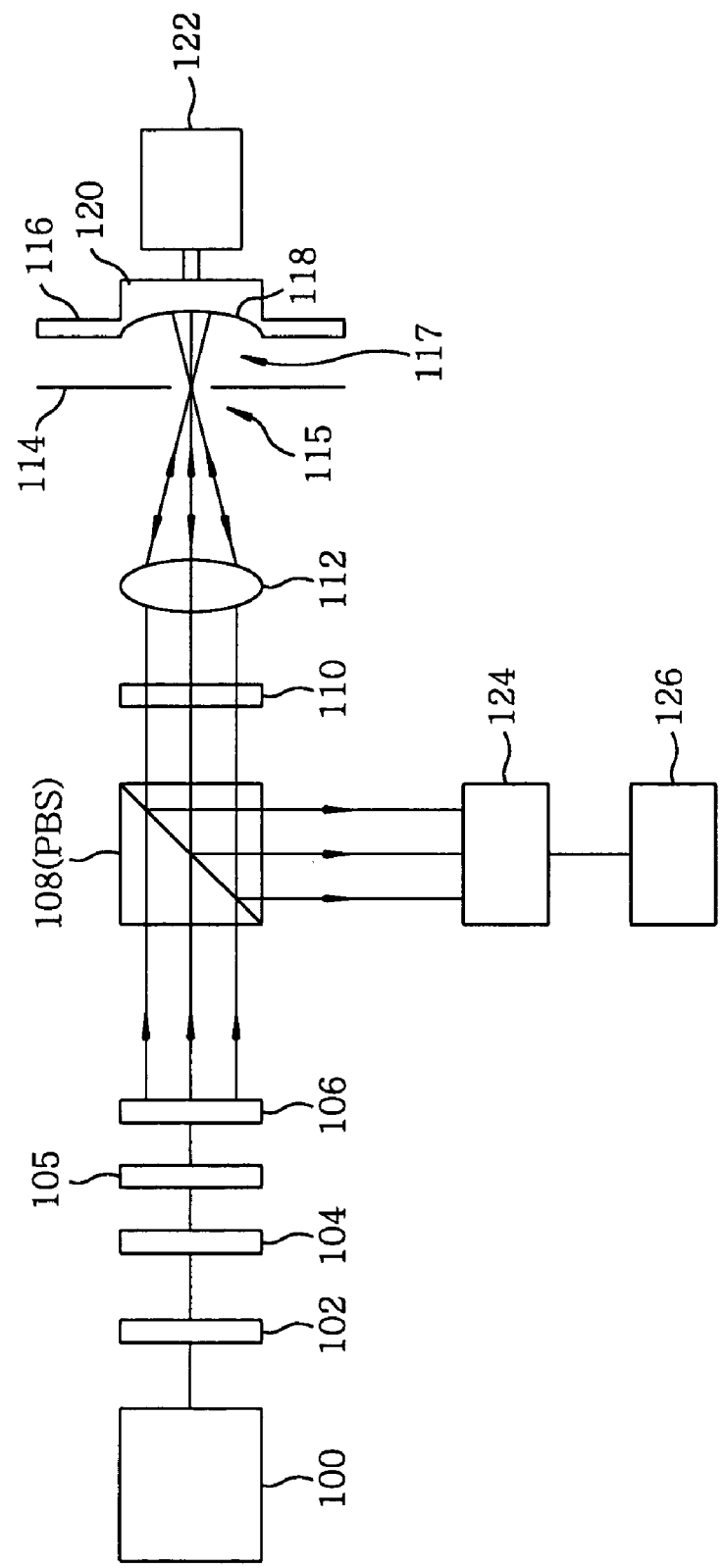
FIG. 4 represents an apparatus for aligning a holographic medium with a data mask in accordance with a preferred embodiment of the present invention.

FIG. 4 represents an apparatus for aligning a holographic medium with a data mask before recording data on the holographic medium by using the data mask in accordance with a preferred embodiment of the present invention. The apparatus of FIG. 4 includes a light source 100; a shutter 102; a HWP (half wave plate) 104; a polarizer 105; a spatial filter 106; a PBS (polarization beam splitter) 108; a QWP (quarter wave plate) 110; a lens 112; a data mask 114; a holographic medium 116; a hemispheric mirror 118; a clamp 120 for clamping the hemispheric mirror 118 to a center aperture 117 of the holographic medium 116; a spindle motor 122; a detector 124; and a controller 126.

The light source 100 emits a laser beam with a constant wavelength, e.g., a wavelength of 532 nm. The laser beam, which is of only one type of linear polarization, e.g., P- or S-polarization, is provided to the HWP 104 via the shutter 102, which is opened to transmit the laser beam therethrough when aligning the holographic medium 116 with the data mask 114. The HWP 104 rotates the polarization of the laser beam by θ degrees (preferably 45°). And then, the polarization-rotated laser beam is fed to the polarizer 105 capable of transmitting, e.g., only a S-polarized laser beam. The transmitted S-polarized laser beam is provided to the spatial filter 106 for removing noises included in the transmitted S-polarized laser beam.

And then, the S-polarized laser beam is provided to the PBS 108 capable of transmitting, e.g., only a horizontally polarized laser beam, i.e., an S-polarized beam, and reflecting, e.g., a vertically polarized laser beam, i.e., a P-polarized beam. Since the S-polarized laser beam is provided to the PBS 108, the laser beam is transmitted therethrough. And then the transmitted laser beam is provided to the QWP 110. In general, a QWP can have the unique property of converting a circularly polarized light into a linearly polarized light and vice versa. More specifically, an S-polarized beam (or a P-polarized beam) is turned into a circularly polarized beam after passing through a QWP and then the circularly polarized beam is transformed into a P-polarized beam (or an S-polarized beam) after passing through the QWP once again.

Therefore, the QWP 110 converts the inputted S-polarized laser beam into a circularly polarized laser beam, which is then fed to the lens 112. Since the data mask 114 is located at a focal length of the lens 112, the lens 112 focuses the circularly polarized laser beam at a pinhole 115, which is located at a center portion of the data mask 114, with a size of, e.g., 5 μm. Thus, the lens 112 can provide the circularly polarized laser beam to the hemispheric mirror 118 via the pinhole 115 and the aperture 117, which is a central hole portion of the holographic medium 116. The hemispheric mirror 118 may also be formed on a depressed portion of the clamp 120 as a single body or as a separate body. The clamp 120 is, e.g., inserted into the aperture 117 to align the center of the holographic medium 116 with the center of the hemispheric mirror 118 and the holographic medium 116 is rotated by the spindle motor 122 connected to the clamp 120.

Figure 5A:
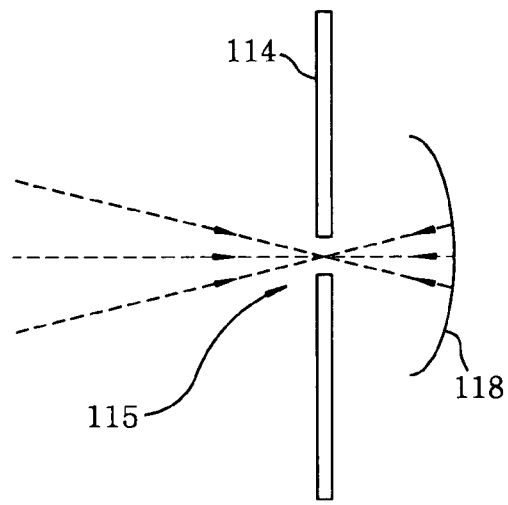
FIGS. 5A and 5B illustrate paths of beams when the holographic medium and the data mask are aligned and misaligned, respectively.

If the data mask 114 and the holographic medium 116 are properly aligned as shown in FIG. 5A, the center of the pinhole 115 should correspond to the center of a virtual sphere, a surface thereof including a surface of the hemispheric mirror 118. That is, the center of the pinhole 115 of the data mask 114 should be substantially coincident with the focal point of the hemispheric mirror 118. Thus, the hemispheric mirror 118 reflects the circularly polarized laser beam back to the lens 112 via the center of the pinhole 115, the reflected circularly polarized laser beam being focused at the center of the pinhole 115. Therefore, the amount of the circularly polarized laser beam passing through the pinhole 115 reaches a maximum value.

And then the lens 112 provides the reflected circularly polarized laser beam to the QWP 110. Thereafter, the QWP 110 transforms the reflected circularly polarized laser beam into a P-polarized laser beam and then provides the P-polarized laser beam to the PBS 108. Since the P-polarized laser beam is reflected by the property of the PBS 108, the detector 124 detects the P-polarized laser beam. The amount of the P-polarized laser beam detected by the detector 124 also attains the maximum value when the center of the holographic medium 116 is properly aligned with the pinhole 115 with the help of the hemispheric mirror 118.

Figure 1:
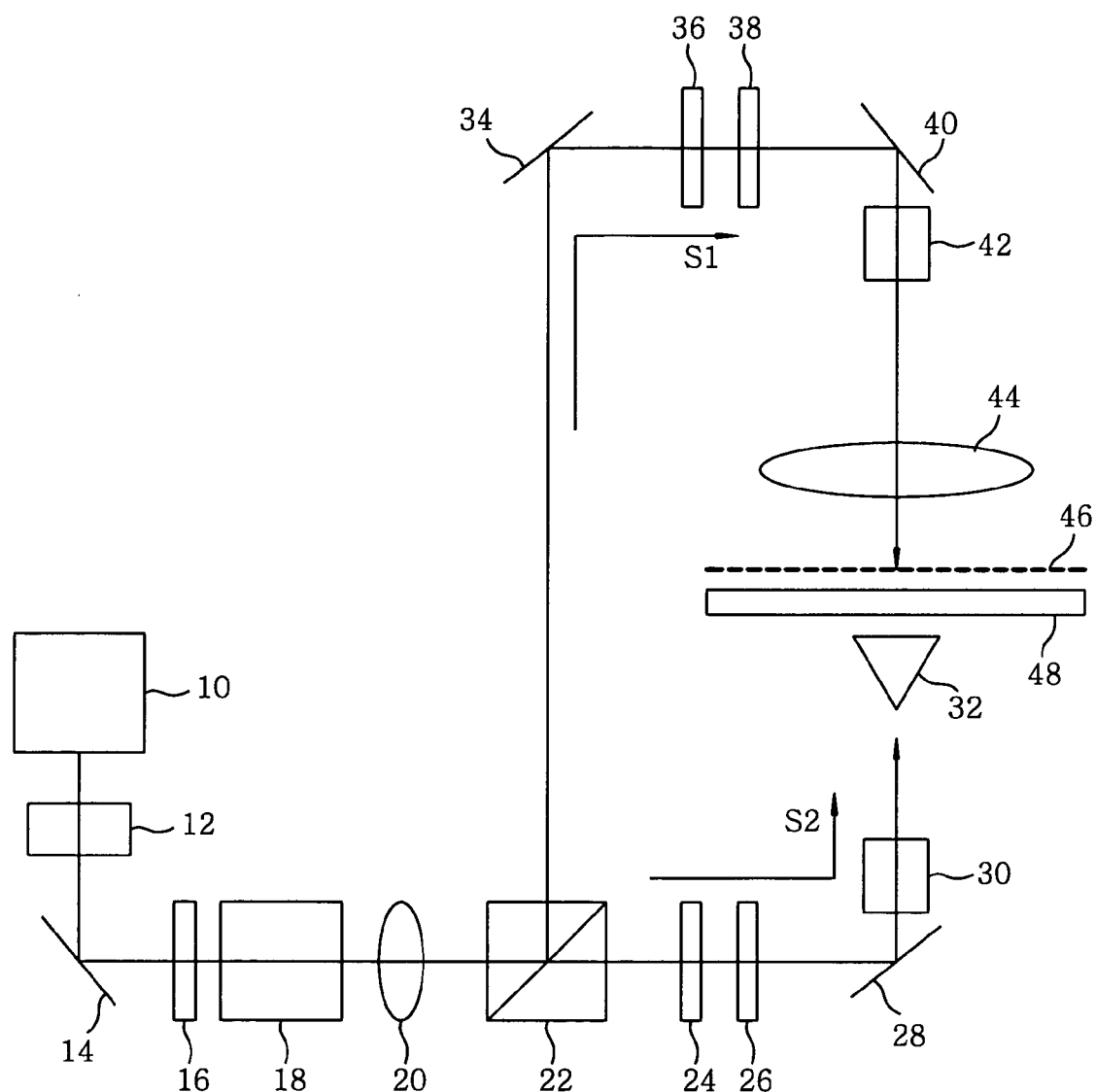
FIG. 1 shows a conventional holographic ROM system.
Figure 2:
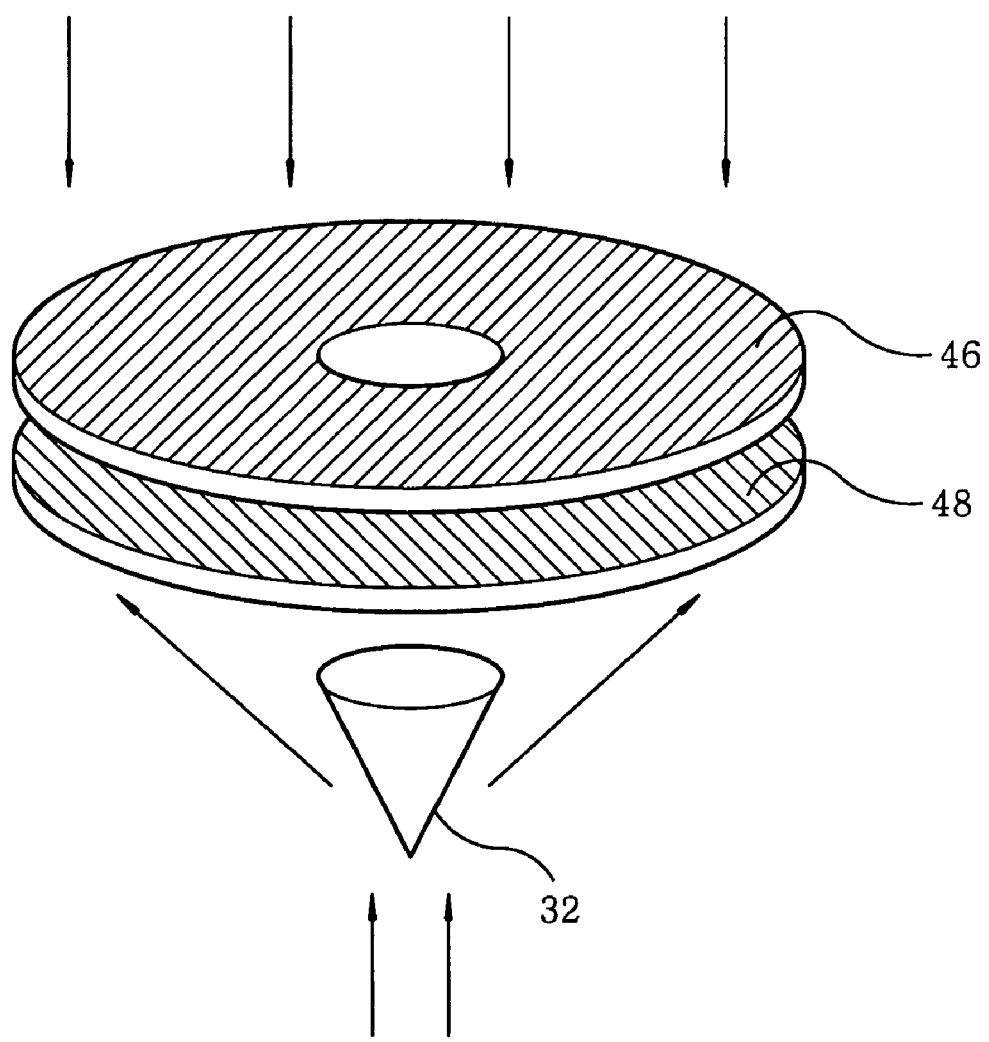
FIG. 2 describes a conventional method for recording the holographic ROM in detail.
Figure 3:
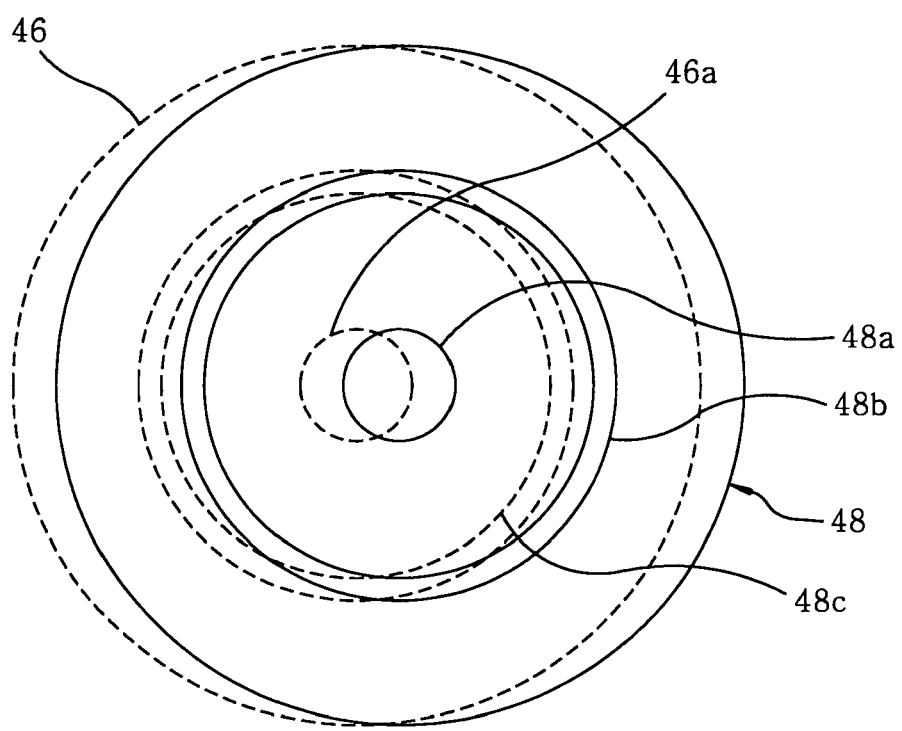
FIG. 3 presents a misaligned arrangement between a holographic medium and a data mask.
Figure 5B:
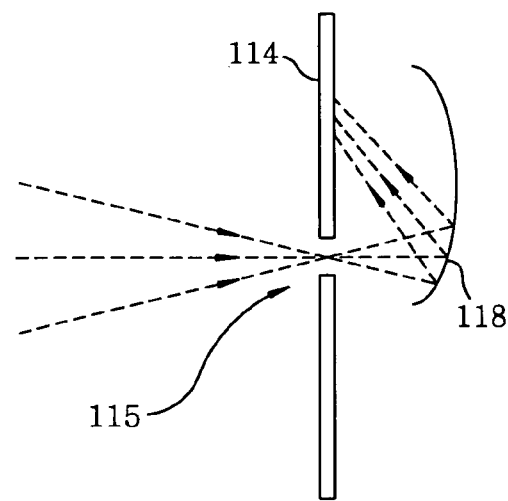

On the other hand, if the data mask 114 and the holographic medium 116 are not properly aligned as shown in FIG. 5B, the center of the pinhole 115 does not correspond to the center of the virtual sphere including the surface of the hemispheric mirror 118. Thus, the circularly polarized laser beam reflected by the hemispheric mirror 118 cannot be fully transmitted to the lens 112 via the center of the pinhole 115. Thus, the amount of the reflected circularly polarized laser beam passing through the pinhole 115 is smaller than the maximum value. Therefore, the amount of the reflected circularly polarized laser beam detected by the detector 124 also becomes smaller than the maximum value, which means that the data mask 114 and the holographic medium 116 are not properly aligned. Then, if the amount of the reflected circularly polarized laser beam is smaller than a threshold value which is a predetermined value near the maximum value, the detector 124 sends a signal indicating the misalignment to the controller 126 for controlling an actuator (not shown). Then, the actuator adjusts either the position of the data mask 114 or the position of the holographic medium 116 in order to align the data mask 114 and the holographic medium 116. After being aligned, the data mask 114 and the holographic medium 116 can be applied to, e.g., the holographic ROM system of FIG. 1, in order to record data on the holographic medium 116.

In the apparatus of FIG. 4, the shutter 102, the HWP 104, the polarizer 105 and the spatial filter 106 can be omitted if the light source 100 is S-polarized. However, the shutter 102, the HWP 104, the polarizer 105 and the spatial filter 106 are preferably adopted to acquire a more accurate and measured result.

While the invention has been shown and described with respect to the preferred embodiments, it will be understood by those skilled in the art that various changes and modifications may be made without departing from the spirit and the scope of the invention as defined in the following claims.

What is claimed is:

1. A holographic apparatus comprising:
 a beam supplying unit for supplying an incident laser beam;
 a transferring unit for receiving the incident laser beam and producing a focused laser beam;
 a reflecting unit including a holographic medium for receiving the focused laser beam through an opening and then reflecting the received laser beam back to the opening, wherein the amount of the reflected laser beam passing through the opening varies depending on whether or not the holographic medium is aligned with the opening, and wherein the reflected laser beam passing through the opening returns to the transferring unit and then is converted into a return laser beam by the transferring unit; and
 a detecting unit for checking the amount of the return laser beam to determine whether the opening and the holographic medium are aligned or not.

2. The apparatus of claim 1, wherein the reflecting unit further includes:
 a data mask provided with the opening at a center thereof; and
 a reflection mirror, coupled with the holographic medium, for reflecting the received laser beam to the opening to thereby allow the holographic medium to be aligned with the data mask.

3. The apparatus of claim 2, wherein the data mask is used to record data on the holographic medium upon the completion of alignment.

4. The apparatus of claim 2, wherein the reflection mirror is a hemispheric mirror, with a center of the opening of the data mask being substantially coincident with a focal point of the hemispheric mirror.

5. The apparatus of claim 1, wherein the transferring unit includes:
 a polarization beam splitter for transmitting the incident laser beam;
 a quarter wave plate for converting the incident laser beam into a first parallel laser beam; and
 a lens for focusing the first parallel laser beam at the opening, to thereby produce the focused laser beam,
 wherein the reflected laser beam passing through the opening is provided to the lens by the reflecting unit and the lens transforms the reflected laser beam into a second parallel laser beam, and
 wherein the quarter wave plate converts the second parallel laser beam into the return laser beam which is reflected toward the detecting unit by the polarization beam splitter.

6. The apparatus of claim 5, wherein the opening is located at a focal length of the lens.

7. The apparatus of claim 1, wherein the beam supplying unit includes:
 a light source for generating a source laser beam; and
 a filter unit for producing the incident laser beam of a linear polarization from the source laser beam.

8. A holographic apparatus comprising:
 a beam supplying unit for supplying an incident laser beam;
 a lens for focusing the incident laser beam at an opening to thereby produce a focused laser beam;
 a data mask, which is used for recording data therein on a holographic medium and has the opening at a central portion thereof, for transmitting the focused laser beam through the opening; and
 a reflection mirror, coupled with the holographic medium, for reflecting the focused laser beam transmitted by the data mask, wherein the reflected laser beam passing through the opening is provided to a detecting unit for checking the amount of the reflected laser beam passing through the opening to determine whether the data mask and the holographic medium are aligned or not.

9. A holographic method comprising the steps of:
(a) providing an incident laser beam;
(b) transmitting the incident laser beam through a opening which is located at a central portion of a data mask which is used for recording data therein on a holographic medium;
(c) reflecting the transmitted incident laser beam by a reflection mirror which is coupled with the holographic medium;
(d) transmitting the reflected laser beam through the opening; and
(e) detecting the amount of the reflected laser beam passing through the opening to determine whether the data mask and the holographic medium are aligned or not.

* * * * *